United States Patent
Zhang

(10) Patent No.: US 8,366,216 B2
(45) Date of Patent: Feb. 5, 2013

(54) DRAWER AND ELECTRONIC DEVICE USING THE SAME

(75) Inventor: Shuai Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 366 days.

(21) Appl. No.: 12/820,328

(22) Filed: Jun. 22, 2010

(65) Prior Publication Data

US 2011/0187249 A1  Aug. 4, 2011

(30) Foreign Application Priority Data

Feb. 1, 2010  (CN) .......................... 2010 1 0301010

(51) Int. Cl.
*A47B 95/00* (2006.01)

(52) U.S. Cl. ........................................ 312/333; 312/218

(58) Field of Classification Search .......... 312/216–222, 312/333; 70/120, 85–88; 361/679.57, 679.58
See application file for complete search history.

(56) References Cited

U.S. PATENT DOCUMENTS

| | | | | |
|---|---|---|---|---|
| 1,046,438 | A * | 12/1912 | Caldwell | 70/358 |
| 5,183,310 | A * | 2/1993 | Shaughnessy | 296/106 |
| 5,632,166 | A * | 5/1997 | Wiersma | 70/120 |
| 7,184,261 | B2 * | 2/2007 | Chung | 361/679.56 |
| 7,478,892 | B2 * | 1/2009 | Punzel et al. | 312/322 |
| 8,144,462 | B2 * | 3/2012 | Chen | 361/679.57 |
| 8,197,018 | B2 * | 6/2012 | Tang et al. | 312/223.2 |
| 2007/0084258 | A1 * | 4/2007 | Matyko et al. | 70/120 |
| 2007/0227205 | A1 * | 10/2007 | Hill et al. | 70/120 |

* cited by examiner

*Primary Examiner* — Hanh V Tran
(74) *Attorney, Agent, or Firm* — Altis Law Group, Inc.

(57) ABSTRACT

A drawer received in an electronic device includes a drawer assembly and a locking assembly. The drawer assembly is detachable attached to the electronic device and can be used as a carrying case for components of the electronic device. The locking assembly includes a rotatable key set on the drawer assembly, a rod operable to fix or release the drawer assembly from the electronic device, and a moveable member movably connected between the rotatable key and the rod. The moveable member is driven by the rotatable key to drive the rod to fix or release the drawer assembly from the electronic device.

17 Claims, 6 Drawing Sheets

DRAWER AND ELECTRONIC DEVICE USING THE SAME

BACKGROUND

1. Technical Field

The present disclosure relates to electronic devices, and particularly to an electronic device with a drawer.

2. Description of Related Art

A hard disk drive (HDD) is an important component of a computer. For protecting the HDD, the HDD is normally installed inside a host computer. As such, if the HDD needs to be replaced or repaired, the host must be disassembled, which is inconvenient.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiment of an electronic device with a drawer. Moreover, in the drawings, like reference numerals designate corresponding parts throughout several views.

DETAILED DESCRIPTION

Embodiments of the present disclosure will now be described in detail with reference to the drawings.

Figure 1:
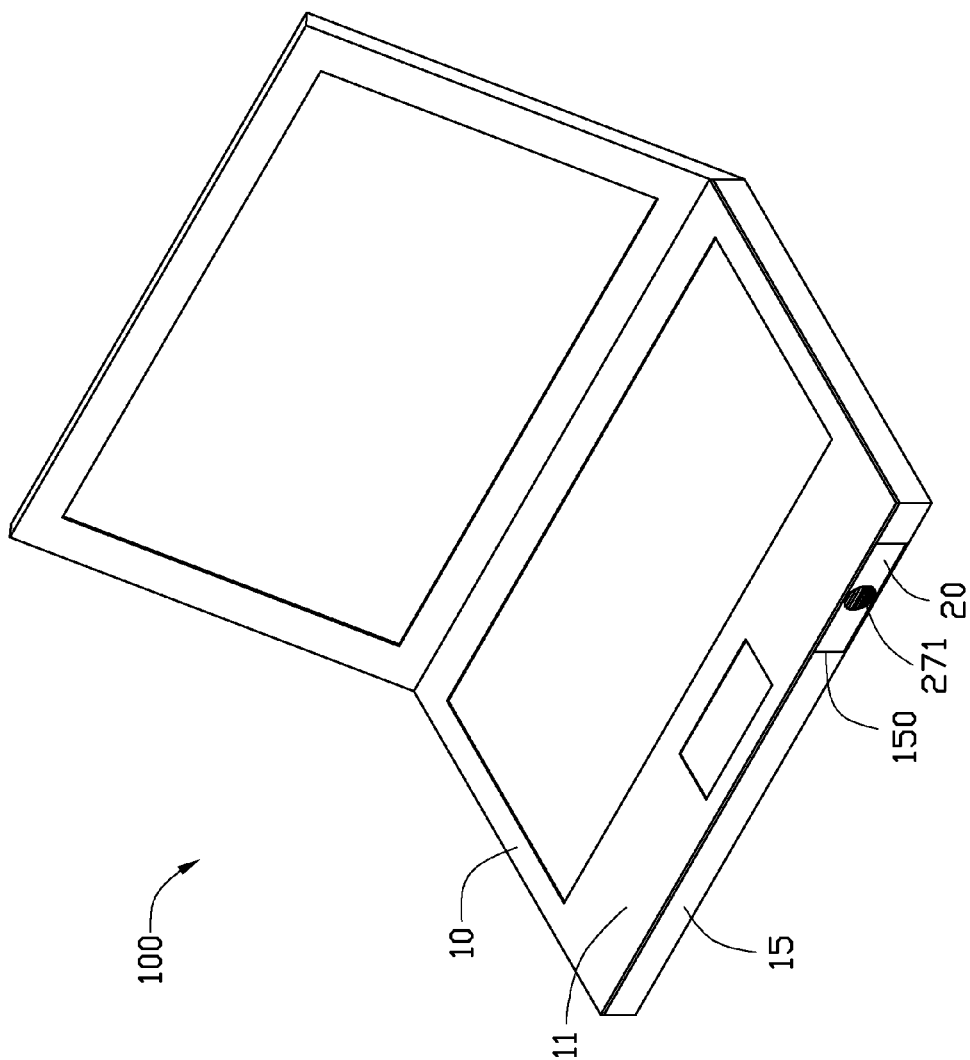
FIG. 1 is an isometric, schematic view of an electronic device having a locking assembly, according to an exemplary embodiment, the locking assembly includes a rotatable key.
Figure 2:
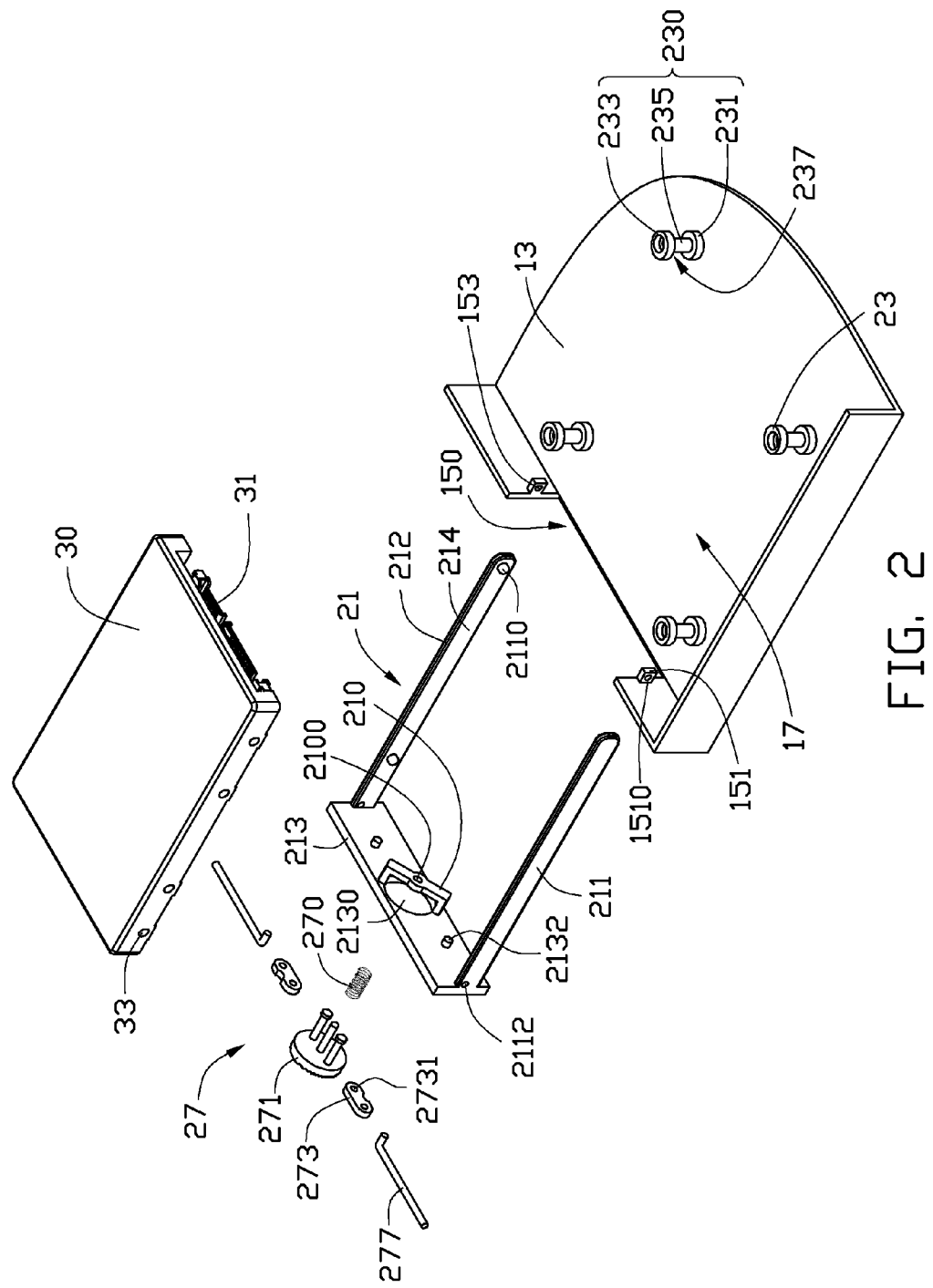
FIG. 2 is a partially exploded view of the electronic device of FIG. 1.

Referring to FIGS. 1 and 2, an electronic device 100 according to an exemplary embodiment is illustrated. The electronic device 100 includes a housing 10, a drawer 20 received in the housing 10, and a component 30 carried by the drawer 20. In this embodiment, the component 30 is a hard disk drive (HDD), and the electronic device 100 is a notebook computer. In other embodiments, the component 30 can be a battery, a CD/DVD drive, or other components, and the electronic device 100 can be a desktop computer, a DVD player, or other electronic devices.

The component 30 includes an interface portion 31. The interface portion 31 is used for electrically connecting the component 30 to a circuit board (not shown) of the electronic device 100. A plurality of limiting holes 33 is defined on opposite sides of the component 30 next to the interface portion 31.

The housing 10 includes a top wall 11, a bottom wall 13, and a side wall 15 connecting the top wall 11 to the bottom wall 13. The top wall 11, the bottom wall 13, and the side wall 15 cooperate to define a receiving room 17. An opening 150 is defined in the side wall 15. The opening 150 is used for receiving for the drawer 20 to move in and out of the housing 10.

The drawer 20 includes a drawer assembly 21, a guiding assembly 23, and a locking assembly 27.

The drawer assembly 21 is received in the receiving room 17 and is used for carrying the component 30. The drawer assembly 21 is configured to move in and out of the housing 10 via the opening 150. The drawer assembly 21 includes a first limiting portion 151, a second limiting portion 153 opposite to the first limiting portion 151, a first slider 211, a second slider 212 substantially parallel to the first slider 211, and a face plate 213 perpendicularly connected to the first slider 211 and the second slider 212. One end of the face plate 213 is connected to the first slider 211, and the other end of the face plate 213 is connected to the second slider 212. The two limiting portions 151 and 153 are set on the inside surface of the side wall 15. Each of the limiting portions 151 and 153 defines a first through hole 1510. The opening 150 is between the two limiting portions 151 and 153. The first slider 211 and the second slider 212 define two second through holes 2112 corresponding to the first through holes 1510.

The two sliders 211 and 212, and the face plate 213 cooperate to define a receiving space 214. The receiving space 214 is used for receiving the component 30. A plurality of limiting poles 2110 is set on inner sides of the first slider 211 and the second slider 212. The limiting poles 2110 corresponds to the limiting holes 33 of the component 30. The drawer assembly 21 via the limiting poles 2110 is inserted into the corresponding limiting holes 33. When the component 30 is carried out, the interface portion 31 is away from the face plate 213, and electrically connects with the circuit board of the electronic device 100. The face plate 213 is received in the opening 150, and allows convenient manipulation by users for moving the drawer assembly 21 in and out of the receiving room 17.

In other embodiments, the drawer assembly 21 can be other structures as long as the drawer assembly 21 can carry the component 30. For example, the assembly 21 can further include a bottom plate perpendicularly connected to the two sliders 211 and 212, and the face plate 213. The receiving space 214, used for receiving the component 30, is defined in the bottom plate, the two sliders 211 and 212, and the face plate 213.

The face plate 213 is substantially rectangular and is configured to cover the opening 150. A first receiving hole 2130 is defined in the middle of the face plate 213. In this embodiment, the first receiving hole 2130 is substantially round. A limiting member 210 and two protrusions 2132 are set on the same side of the face plate 213 opposing the two sliders 211 and 212. The limiting member 210 is substantially bridge-shaped and located above the first receiving hole 2130. The limiting member 210 defines a second receiving hole 2100. The second receiving hole 2100 is substantially elliptic and corresponds to the first receiving hole 2130. One of the protrusions 2132 is set between the first slider 211 and the limiting member 210, and the other one is set between the second slider 212 and the limiting member 210.

The guiding assembly 23 is used for supporting the drawer assembly 21 and guiding the drawer assembly 21 to slide in and out of the receiving room 17. The guiding assembly 23 includes four guiding members 230. Each guiding member 230 includes a first fixing portion 231, a second fixing portion 233 substantially parallel to the first fixing portion 231, and a connecting portion 235 connecting the two fixing portions 231 and 233 and are configured to define a guiding groove 237.

The first fixing portion 231 is set on the bottom wall 13 and faces the top wall 11. The guiding groove 237 is used for receiving one of the two sliders 211 and 212. The guiding assembly 23 has four guiding members 230, four guiding grooves 237 are defined accordingly. Two of the four guiding grooves 237 receive the first slider 211, and the other two grooves 237 receive the second slider 212. Thus, the drawer assembly 21 is slid along the guiding assembly 23 and in the four grooves 237 and against the connecting portion 235. In this embodiment, the two fixing portions 231 and 233, and the connecting portion 235 are substantially cylindrical. The cylindrical connecting portion 235 gives a low friction force to the sliding drawer assembly 21. In other embodiments, the two fixing portions 231 and 233 can be other shapes.

In the embodiment, screws can be engaged with the guiding assembly 23 and the bottom wall 13, thus, the guiding assembly 23 is fixed on the bottom wall 13. The guiding assembly 23 can also be fixed on the bottom wall 13 by means of any suitable adhesive.

In other embodiments, the number of the guiding members 230 can be more than four, and the guiding assembly 23 can be another structure as long as the guiding assembly 23 can guide the drawer assembly 21 to slide in and out of the receiving room 17. For example, the guiding assembly 23 can have two opposite grooves, one of the two grooves receives the fixing slider 211, and the other one receives the second slider 212.

To keep the drawer assembly 21 from disengaging out of the receiving room 17 of the housing 10, the locking assembly 27 is used for locking the drawer assembly 21 to the housing 10. The locking assembly 27 includes a rotatable key 271, an elastic member 270, two moveable members 273, and two rods 277.

The elastic member 270 is a spring. In other embodiments, the elastic member 270 can be a ring made of elastic material, such as rubber.

The two moveable members 273 have the same structure. Each of the two moveable members 273 defines two holes 2731.

Figure 3:
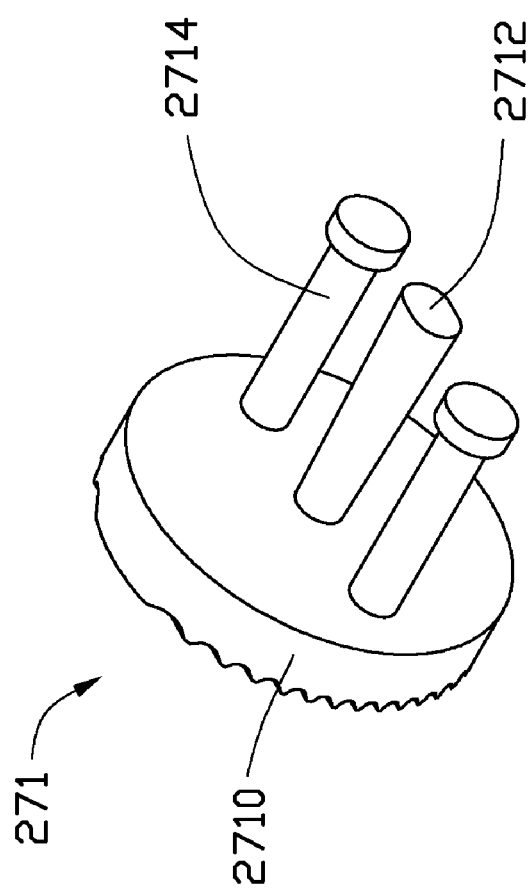
FIG. 3 is an enlarged view of the rotatable key of the electronic device of FIG. 2.

Referring to FIGS. 2 and 3, the rotatable key 271 includes a keycap 2710, a first fixing member 2712, and two second fixing members 2714 extending from the same side of the keycap 2710. The keycap 2710 is received in the first receiving hole 2130 of the face plate 213, and can be rotated by an external force. In this embodiment, the out surface of the keycap 2710 is a rough texture for being rotated easily. The rough out surface of the keycap 2710 is formed by setting several embossed strips thereon. Of course, the rough out surface of the keycap 2710 can be formed by defining several recesses thereon.

One end of the first fixing member 2712 connected to the keycap 2710 is substantially round, and the other end of the first fixing member 2712 away from the keycap 2710 is substantially elliptic. The first fixing member 2712 extends through the second receiving hole 2100 of the limiting member 210 to be received in the second receiving hole 2100. The elastic member 270 sleeves on the round end of the first fixing member 2712 and is positioned between the keycap 2710 and the limiting member 210. The elliptic end of the first fixing member 2712 is free. The radius of the round end is smaller than the semi minor axis of the elliptic end.

The two second fixing members 2714 are symmetrical about the first fixing member 2712. Ends of the two second fixing members 2714 are set on the keycap 2710, the other ends are free. The two second fixing members 2714 extend through the corresponding holes 2731. In this embodiment, the two second fixing members 2714 are bolts which are engaged with the keycap 2710, thus, the two moveable members 273 are fixed to each corresponding second fixing member 2714 by bolts and cannot be moved away from the corresponding second fixing members 2714.

Figure 4:
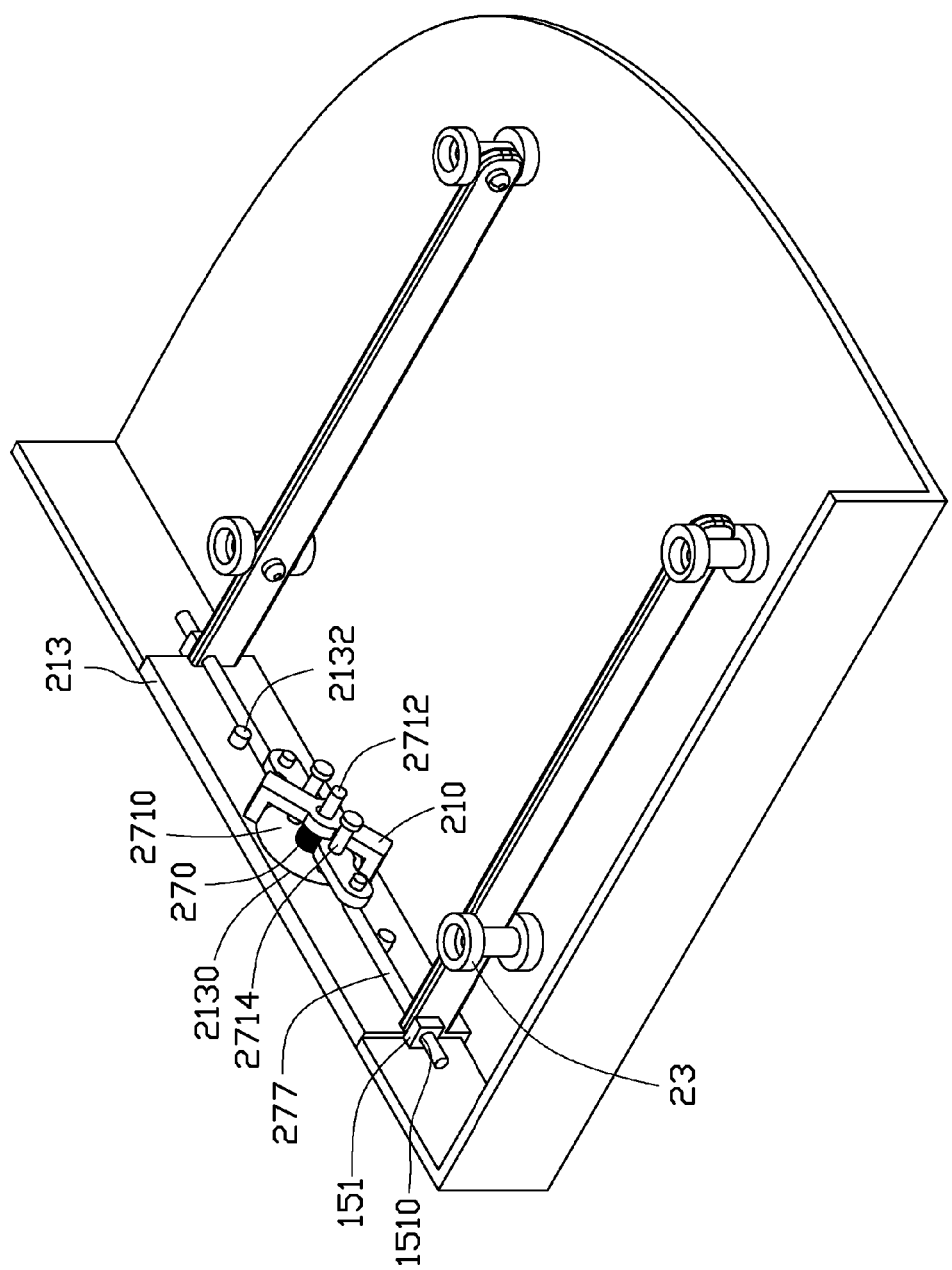
FIG. 4 is a partially isometric, schematic view of the electronic device of FIG. 1.

Further referring to FIG. 4, the two rods 277 have the same structure. Ends of the two rods 277 are received in the corresponding first through holes 1510 after passing through the second corresponding through holes 2112. The other ends of the two rods 277 are substantially perpendicular to the shafts of the two rods 277, respectively, and are received in the corresponding holes 2731. Thus, the two moveable members 273 connect the two rods 277 and 279 to the rotatable key 271.

When the keycap 2710 is pressed, the keycap 2710 drives the first fixing member 2712 to further extend through the second receiving hole 2100 of the limiting member 210, thus the elastic member 270 is deformed. The free end of the first fixing member 2712 protrudes out of the second receiving hole 2100. Then when the keycap 2710 is rotated, the first fixing member 2712 is driven by the keycap 2710 to rotate until the elliptic end of the keycap 2710 is fastened with the limiting member 210. As such, even if the pressure on the keycap 2710 is released, the first fixing member 2712 is still fastened with the limiting member 210 because of the elliptic end. The free end of the first fixing member 2712 will be received in the second receiving hole 2100 again until the keycap 2710 is rotated back. When the keycap 2710 is rotated back, the elastic member 270 is reset and drives the keycap 2710 to be reset.

Figure 5:
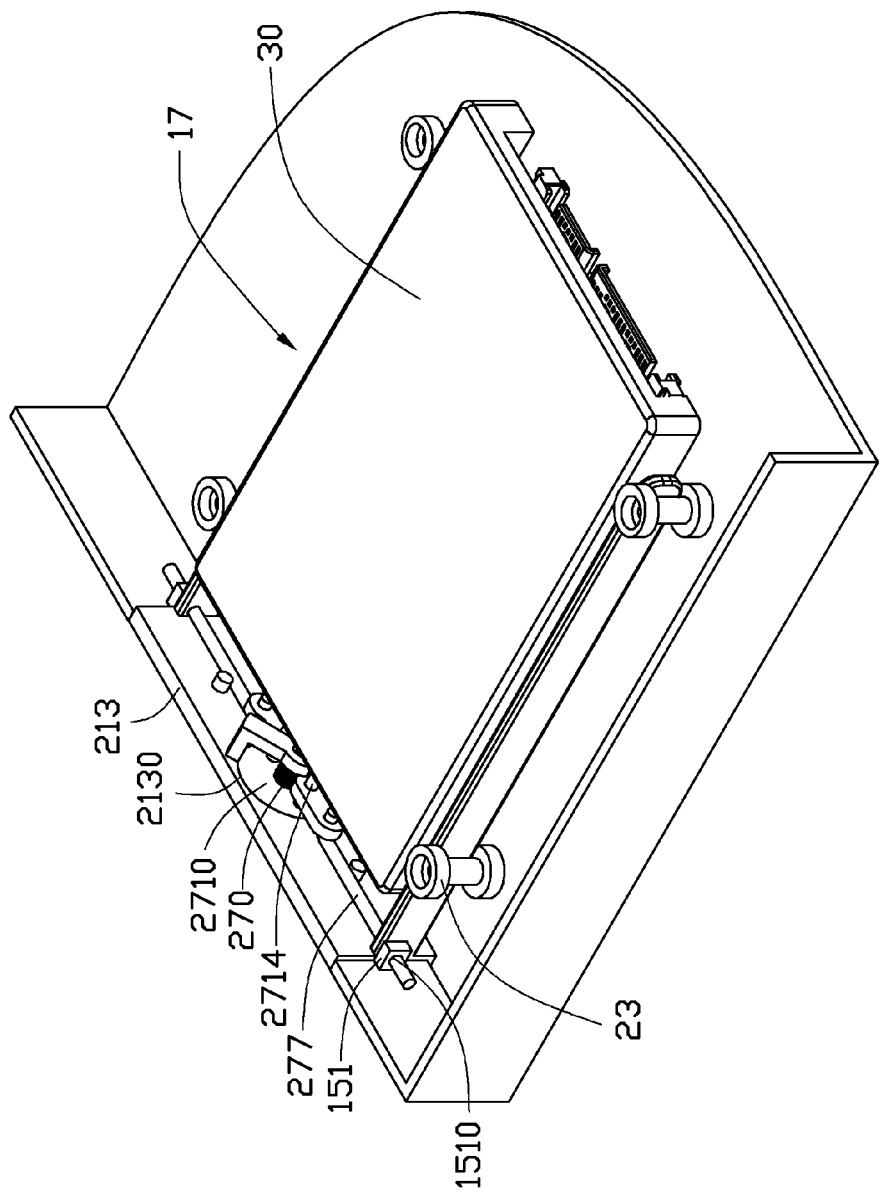
FIG. 5 is a partially, schematic view of the electronic device of FIG. 1 in a closed state.
Figure 6:
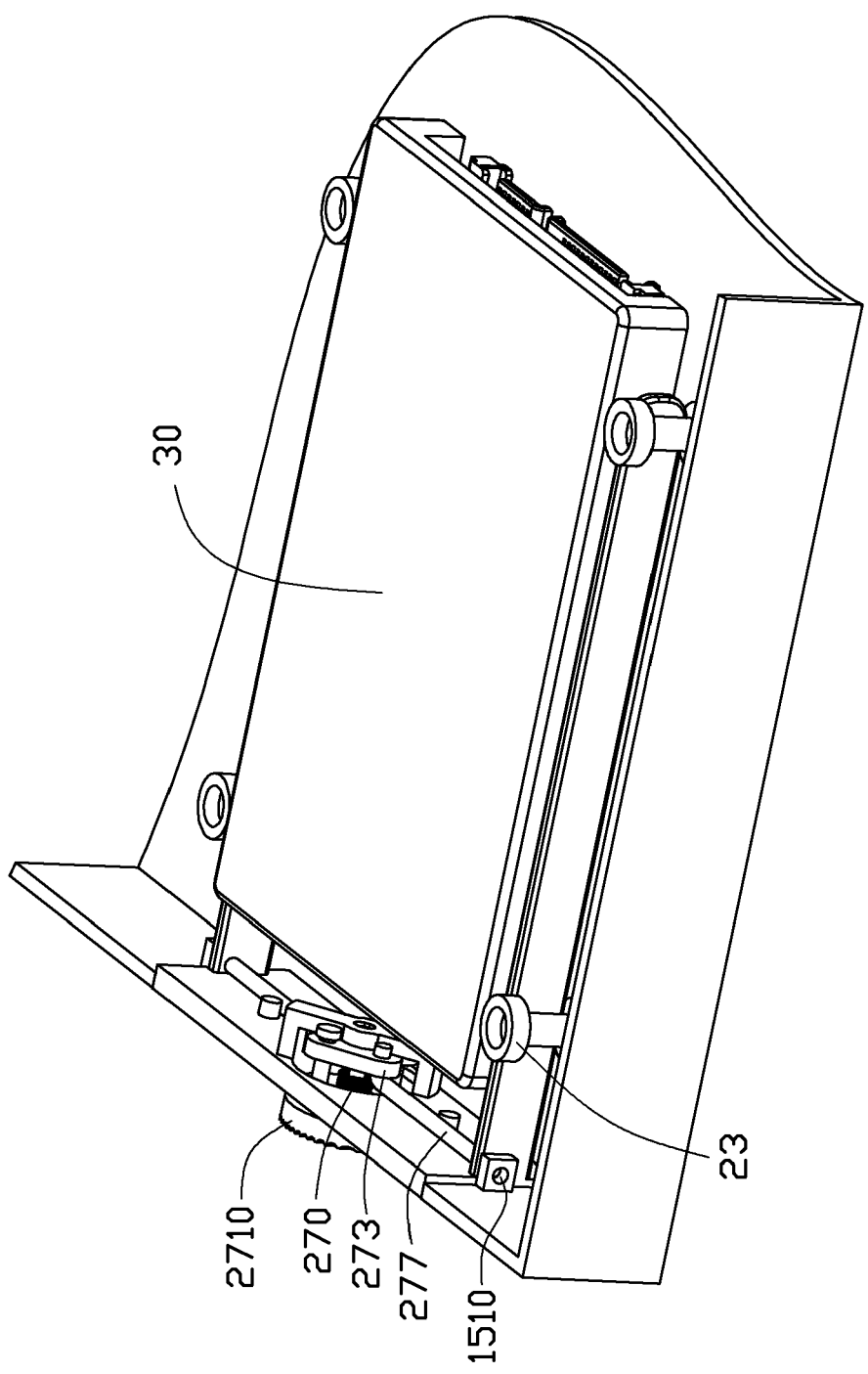
FIG. 6 is a partially, schematic view of the electronic device of FIG. 1 in another closed state.

When the keycap 2710 is pressed and rotated, the keycap 2710 drives the two moveable members 273 to rotate about the centre of the second fixing members 2714. The two moveable members 273 push or pull the rods 277 to further extend through or withdraw from the first through holes 1510. When the two rods 277 pass through the first through holes 1510, the locking assembly 27 locks the drawer assembly 21 in the receiving room 17 (see FIG. 5). When the two rods 277 withdraw from the first corresponding through holes 1510, the locking assembly 27 unlocks the drawer assembly 21 from the housing 10 (see FIG. 6).

In this embodiment, each of the two protrusions 2132 of the face plate 213 are above or below but near the two rods 277, respectively, to balance a force exerted by the two moveable members 273 when the keycap 2710 is rotated.

In other embodiments, one of the two moveable members 273, and one of the two corresponding rods 277 can be removed. Thus, the locking assembly 27 only uses one moveable member 273 and one corresponding rod 277 to lock and unlock.

As described above, when the locking assembly 27 locks the drawer assembly 21, carrying the component 30, within the receiving room 17 of the housing 10. The component 30 is enclosed for protection. When the drawer assembly 21 is unlocked with the locking assembly 27, the component 30 can be carried, from the housing 10. The component 30 can be move out of the drawer assembly 21. Thus, it is easy for users to remove or replace the component 30.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A drawer received in an electronic device defining an opening, the drawer comprising:
    a drawer assembly for being detachably attached to the electronic device and operable to be used as a carrying case for components of the electronic device, the drawer assembly comprising a face plate operable to cover the opening, the face plate defining a first receiving hole and comprising a bridge-shaped limiting member located above the face plate, and the bridge-shaped limiting member defining a second receiving hole corresponding to the first receiving hole; and a locking assembly comprising:
  a rotatable key set on the drawer assembly, and comprising a keycap, a first fixing member, and two second fixing members extending from the same side of the keycap, the keycap being rotatably received in the first receiving hole of the face plate, the first fixing member extending through the second receiving hole of the limiting member and being received in the second receiving hole;
  two rods operable to fix or release the drawer assembly from the electronic device, and
  two movable members, each moveable member defining two holes to respectively allow one second fixing member and one end of the rod to extend therethrough, the moveable members being configured to drive the rods to fix or release the drawer assembly from the electronic device when driven by the second fixing members of the rotatable key.

2. The drawer of claim 1, wherein the drawer assembly defines a first through hole, the electronic device defines a second through hole corresponding to the first through hole, the rod passes through or withdraws from the drawer assembly and the electronic device via the first through hole and the second through hole.

3. The drawer of claim 1, wherein the drawer assembly comprises a first slider, a second slider substantially parallel to the first slider, and the face plate substantially perpendicularly connecting opposite ends of the first slider and the second slider together, the first slider, the second slider, and the face plate cooperate to define a frame for receiving the component.

4. The drawer of claim 3, wherein one of the first slider and the second slider defines a first through hole, the drawer assembly comprises a limiting portion fixed on the electronic device, the limiting portion defines a second through hole corresponding to the first through hole, the rod passes through or withdraws from the drawer assembly and the electronic device via the first through hole and the second through hole.

5. The drawer of claim 1, wherein one end of the first fixing member connected to the keycap is substantially round, and the other end of the first fixing member away from the keycap is substantially elliptic, when the keycap is rotated, the first fixing member is driven by the keycap to rotate until the elliptic end of the keycap is fastened with the limiting member.

6. The drawer of claim 5, wherein the drawer assembly further comprises an elastic member, the elastic member sleeves on the round end of the first fixing member and is positioned between the keycap and the limiting member.

7. The drawer of claim 6, wherein when the keycap drives the first fixing member to further extend through the second receiving hole of the limiting member, the elastic member is deformed, the free end of the first fixing member protrudes out of the second receiving hole.

8. The drawer of claim 2, wherein when the keycap drives the moveable member to rotate about the centre of the second fixing members, the moveable member pushes or pulls the rod to further extend through or withdraw from the first through hole.

9. The drawer of claim 7, wherein when the keycap is rotated back, the elastic member is reset and drives the keycap to be reset.

10. The drawer of claim 6, wherein a protrusion protrudes from the face plate, the protrusion of the face plate is near the rod to balance a force exerted by the moveable member when the keycap is rotated.

11. The drawer of claim 1, wherein the drawer further comprises a guiding assembly for supporting the drawer assembly and guiding the drawer assembly to slide in and out of the electronic device.

12. An electronic device, comprising:
  a housing defining an opening;
  a drawer assembly received in the housing and operable to move in and out of the housing via the opening, the drawer assembly comprising a face plate operable to cover the opening, the face plate defining a first receiving hole and comprising a bridge-shaped limiting member located above the face plate, and the bridge-shaped limiting member defining a second receiving hole corresponding to the first receiving hole;
  a component carried by the drawer assembly; and
  a locking assembly for locking and unlocking the drawer assembly from the housing, the locking assembly comprising:
    a rotatable key set on the drawer assembly, and comprising a keycap, a first fixing member, and two second fixing members extending from the same side of the keycap, the keycap being rotatably received in the first receiving hole of the face plate, the first fixing member extending through the second receiving hole of the limiting member and being received in the second receiving hole;
    two rods operable to passing through or withdrawing from the drawer assembly and the housing to connect or disconnect thereof; and
    two movable members, each moveable member defining two holes to respectively allow one second fixing member and one end of the rod to extend therethrough, the moveable members being configured to drive the rods to connect or disconnect the drawer assembly and the housing when driven by the second fixing members of the rotatable key.

13. The electronic device of claim 12, wherein when the rotatable key is pressed and rotated, the rotatable key drives the moveable member to rotate as the centre of the rotatable key, the moveable member pushes or pulls the rod to pass through or withdraw from the housing.

14. The electronic device of claim 13, wherein when the rotatable key is rotated back, the keycap drives the rod to reset.

15. The electronic device of claim 12, wherein the electronic device further comprises a guiding assembly for supporting the drawer assembly and guiding the drawer assembly to slide in and out of the housing.

16. A drawer, comprising:
  a drawer assembly for carrying a component, when the drawer assembly is unlocked, the drawer assembly is operable to move, when the drawer assembly is locked, the drawer assembly is blocked from moving, the drawer assembly comprising a face plate operable to cover an opening of an electronic device, the face plate defining a first receiving hole and comprising a bridge-shaped limiting member located above the face plate, and the bridge-shaped limiting member defining a second receiving hole corresponding to the first receiving hole; and
  a locking assembly for locking and unlocking the drawer assembly, the locking assembly comprising:
    a limiting portion;

a rotatable key set on the drawer assembly, and comprising a keycap, a first fixing member, and two second fixing members extending from the same side of the keycap, the keycap being rotatable received in the first receiving hole of the face plate, the first fixing member extending through the second receiving hole of the limiting member and being received in the second receiving hole;

two rods operable to passing through or withdrawing from the drawer assembly and the limiting portion to connect or disconnect thereof; and two movable members, each moveable member defining two holes to respectively allow one second fixing member and one end of the rod to extend therethrough, the moveable members being configured to drive the rods to connect or disconnect the drawer assembly and the limiting portion when driven by the second fixing members of the rotatable key.

17. The drawer of claim 16, wherein when the rotatable key is pressed and rotated, the rotatable key drives the moveable member to rotate as the centre of the rotatable key, the moveable member pushes or pulls the rod to pass through or withdraw from the limiting portion.

* * * * *